(12) United States Patent
Nelson et al.

(10) Patent No.: US 12,712,415 B1
(45) Date of Patent: Aug. 18, 2026

(54) ROTOR ASSEMBLY BALANCING USING A PARK LOCK GEAR AND BALANCING PLATE

(71) Applicant: Schaeffler Technologies AG & Co. KG, Herzogenaurach (DE)

(72) Inventors: Kyle Nelson, Delaware, OH (US); David Kinion, Cuyahoga Falls, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/170,647

(22) Filed: Apr. 4, 2025

(51) Int. Cl.

| | |
|---|---|
| ***H02K 7/04*** | (2006.01) |
| ***B60K 1/00*** | (2006.01) |
| ***F16H 37/08*** | (2006.01) |
| ***F16H 48/08*** | (2006.01) |
| ***F16H 63/34*** | (2006.01) |
| ***H02K 7/116*** | (2006.01) |
| ***H02K 15/40*** | (2025.01) |

(52) U.S. Cl.
CPC ........... *H02K 7/04* (2013.01); *F16H 63/3425* (2013.01); *H02K 7/116* (2013.01); *H02K 15/40* (2025.01); *B60K 2001/001* (2013.01); *F16H 37/082* (2013.01); *F16H 48/08* (2013.01)

(58) Field of Classification Search
CPC ..... F16H 63/3416–3491; F16H 37/082; F16H 48/08; H02K 7/04; H02K 7/006; H02K 7/116; H02K 15/40; B60K 2001/001
See application file for complete search history.

(56) References Cited

U.S. PATENT DOCUMENTS

| | | | | |
|---|---|---|---|---|
| 10,594,191 | B2 * | 3/2020 | Goldstein | H02K 9/19 |
| 10,823,276 | B2 * | 11/2020 | Francis | F16H 48/06 |
| 10,876,628 | B2 * | 12/2020 | Gruber | B60K 1/00 |
| 11,316,402 | B2 * | 4/2022 | Lee | H02K 5/207 |
| 11,355,997 | B2 * | 6/2022 | Bergan | F16C 32/06 |
| 2013/0187519 | A1 * | 7/2013 | Linnenbrock | H02K 7/04 310/90 |
| 2023/0050189 | A1 * | 2/2023 | Deppert | B60K 1/00 |
| 2023/0387755 | A1 | 11/2023 | Nelson et al. | |
| 2024/0030774 | A1 | 1/2024 | Chapanar et al. | |
| 2024/0258869 | A1 | 8/2024 | Podschwadt | |

(Continued)

FOREIGN PATENT DOCUMENTS

| | | | |
|---|---|---|---|
| CN | 112039275 A | | 12/2020 |
| CN | 212985980 U | * | 4/2021 |

(Continued)

*Primary Examiner* — James J Taylor, II
(74) *Attorney, Agent, or Firm* — Suiter Swantz IP

(57) ABSTRACT

A rotating assembly may include a rotor, a rotor shaft, a park lock gear, and a balancing plate. The park lock gear and the balancing plate may statically balance and dynamically balance the rotating assembly. The park lock gear may include balancing holes for statically and dynamically balancing the rotating assembly. The balancing holes may extend axially through a select thickness of a cylindrical body of the park lock gear. The rotating assembly may be a component of an electric drive unit. The electric drive unit may include a stator. The rotating assembly may be configured to rotate relative to the stator. The electric drive unit may also include a parking pawl which may lock the rotating assembly to the stator via the park lock gear.

20 Claims, 9 Drawing Sheets

(56) References Cited

U.S. PATENT DOCUMENTS

| | | | |
|---|---|---|---|
| 2024/0266903 | A1 | 8/2024 | Kinion et al. |
| 2024/0372439 | A1 | 11/2024 | Linton et al. |
| 2025/0007373 | A1 | 1/2025 | Luo et al. |

FOREIGN PATENT DOCUMENTS

| | | | | | |
|---|---|---|---|---|---|
| CN | 114123636 | A | | 3/2022 | |
| CN | 114623208 | A | * | 6/2022 | ............. B60K 6/383 |
| DE | 102016216582 | B4 | | 9/2018 | |
| DE | 102020132740 | A1 | | 6/2022 | |
| DE | 102022121384 | A1 | | 2/2024 | |
| WO | 2018145696 | A1 | | 8/2018 | |
| WO | 2021069024 | A1 | | 4/2021 | |
| WO | 2022041117 | A1 | | 3/2022 | |

* cited by examiner

ROTOR ASSEMBLY BALANCING USING A PARK LOCK GEAR AND BALANCING PLATE

TECHNICAL FIELD

The present disclosure generally relates to a rotating assembly of an electric drive unit, and more particularly, to balancing the rotating assembly.

BACKGROUND

Imbalances in a high-speed component, such as a rotor of an electrical machine, may be eliminated by balancing the rotor. Balancing can be done, for example, by removing material in a targeted manner along the circumference of the rotating component. Alternatively, additional balancing weights can also be arranged on or in the rotating component to avoid material removal if, for example, it is not possible to drill into the rotating component for material removal due to structural conditions.

This procedure is also referred to as positive or negative balancing. Positive and negative balancing is often carried out on additional components rotating with the rotor, the so-called balancing discs. With positive balancing, material is added at the appropriate position and the rotor is thus balanced. With negative balancing, material is removed from the balancing disk, for example by drilling. The balancing disks are stamped from a metal plate, milled, or produced using a metal casting process. The balancing disks may reduce or compensate for an imbalance in a rotating shaft.

Vehicles driven by electric energy or a combination of electric energy and fuel are gaining more and more attention. In various new energy vehicles, one or more motors are usually installed. These motors are often integrated with the gearbox in the axle. The motor has a stator and a rotor that can rotate relative to each other. To adjust the dynamic balance of the rotor, balancing plates are installed at both axial ends of the rotor. The use of two of the balancing plates, one at both axial ends, may add to the cost, weight, and/or inertia of the rotor. Therefore, it would be advantageous to provide a device, system, and method that cures the shortcomings described above.

SUMMARY

A rotating assembly is described, in accordance with one or more embodiments of the present disclosure. The rotating assembly may include: a park lock gear, wherein the park lock gear includes: a cylindrical body, wherein the cylindrical body forms an internal spline, wherein a plurality of balancing holes are defined axially through at least a portion of the cylindrical body; and a plurality of external teeth, wherein the plurality of external teeth extend radially outward from the cylindrical body, wherein the plurality of external teeth define a plurality of external tooth gaps, wherein the plurality of external teeth and the plurality of external tooth gaps are defined in a polar array about a center axis of the park lock gear; a rotor shaft, wherein the rotor shaft forms an external spline, wherein the internal spline meshes with the external spline; a rotor, wherein the rotor is configured to magnetically couple with a magnetic field causing the rotating assembly to rotate; a sensor rotor; and a balancing plate, wherein the park lock gear, the rotor, the sensor rotor, and the balancing plate are disposed radially outwards of and axially aligned with the rotor shaft, wherein the park lock gear, the rotor, the sensor rotor, and the balancing plate are affixed to and configured to rotate with the rotor shaft, wherein the rotor is disposed axially between the park lock gear and the balancing plate, wherein the park lock gear and the balancing plate are configured to balance the rotating assembly, wherein the park lock gear balances the rotating assembly by the plurality of balancing holes.

In some aspects, the park lock gear and the balancing plate statically balance and dynamically balance the rotating assembly.

In some aspects, the park lock gear is a ratchet gear, wherein the plurality of external teeth and the plurality of external tooth gaps are straight along an axial length of the park lock gear.

In some aspects, the plurality of balancing holes are one of blind-holes or through-holes.

In some aspects, the plurality of balancing holes are blind-holes, wherein the plurality of balancing holes are each defined on a same radial face of the cylindrical body.

In some aspects, an axial depth of the plurality of balancing holes is a same depth for each of the plurality of balancing holes.

In some aspects, the plurality of balancing holes are radially aligned.

In some aspects, the plurality of balancing holes are disposed at circumferential positions defined by an arc segment, wherein the arc segment does not fully revolve around the center axis of the park lock gear.

In some aspects, the plurality of balancing holes include a spacing between circumferentially adjacent of the plurality of balancing holes such that the plurality of balancing holes do not define a slot.

In some aspects, the park lock gear includes one or more poka-yoke features, wherein the one or more poka-yoke features are configured to circumferentially align the internal spline with the external spline such that the internal spline and the external spline mesh at only one orientation.

In some aspects, the internal spline defines the one or more poka-yoke features, wherein the one or more poka-yoke features include one or more cuts along one or more teeth of the internal spline.

In some aspects, the rotor is disposed axially between the sensor rotor and the balancing plate, wherein the sensor rotor is disposed axially between the park lock gear and the rotor.

In some aspects, the rotating assembly may include: a bearing; and a sleeve, wherein the bearing and the sleeve are disposed radially outwards of and axially aligned with the rotor shaft, wherein the bearing and the sleeve are affixed to and configured to rotate with the rotor shaft, wherein the rotor is disposed axially between the sensor rotor and the balancing plate, wherein the sensor rotor is disposed axially between the bearing and the rotor, wherein the bearing is disposed axially between the sleeve and the sensor rotor, wherein the sleeve is disposed axially between the park lock gear and the bearing.

In some aspects, the park lock gear is configured to lock and unlock rotation of the rotating assembly.

An electric drive unit is described in accordance with one or more embodiments of the present disclosure. The electric drive unit may include: a rotating assembly including: a park lock gear, wherein the park lock gear includes: a cylindrical body, wherein the cylindrical body forms an internal spline, wherein a plurality of balancing holes are defined axially through at least a portion of the cylindrical body; and a plurality of external teeth, wherein the plurality of external teeth extend radially outward from the cylindrical body, wherein the plurality of external teeth define a plurality of external tooth gaps, wherein the plurality of external teeth and the plurality of external tooth gaps are defined in a polar array about a center axis of the park lock gear; a rotor shaft, wherein the rotor shaft forms an external spline, wherein the internal spline meshes with the external spline; a rotor, wherein the rotor is configured to magnetically couple with a magnetic field causing the rotating assembly to rotate; a sensor rotor; and a balancing plate, wherein the park lock gear, the rotor, the sensor rotor, and the balancing plate are disposed radially outwards of and axially aligned with the rotor shaft, wherein the park lock gear, the rotor, the sensor rotor, and the balancing plate are affixed to and configured to rotate with the rotor shaft, wherein the rotor is disposed axially between the park lock gear and the balancing plate, wherein the park lock gear and the balancing plate are configured to balance the rotating assembly, wherein the park lock gear balances the rotating assembly by the plurality of balancing holes; a stator; and a park lock pawl, wherein the park lock gear is configured to and unlock the rotating assembly to and from the stator via the park lock pawl.

In some aspects, the techniques described herein relate to an electric drive unit, wherein the park lock pawl includes a pawl tooth, wherein the park lock pawl is configured to translate the pawl tooth radially inwards to engage with one of the plurality of external tooth gaps and radially outwards to disengage from the one of the plurality of external tooth gaps.

In some aspects, the electric drive unit may include: a sensor stator, wherein the sensor stator is axially aligned with and disposed radially outwards of the sensor rotor, wherein the sensor stator is configured to sense a rotary position of the rotating assembly via the sensor rotor.

In some aspects, the electric drive unit may include: an output shaft and a planetary gearset, wherein the output shaft is disposed radially inwards of and axially aligned with the rotor shaft, wherein the output shaft is engaged with the rotating assembly via a differential of the planetary gearset.

A method is described in accordance with one or more embodiments of the present disclosure. The method may include: affixing a rotor to a rotor shaft; affixing a balancing plate and a sensor rotor to the rotor shaft; affixing a park lock gear to the rotor shaft; and axially drilling the park lock gear and the balancing plate to balance the rotating assembly, wherein the axially drilling forms a plurality of balancing holes, wherein the rotating assembly includes the park lock gear, the rotor shaft, the rotor, the balancing plate, and the sensor rotor, wherein the park lock gear includes: a cylindrical body, wherein the cylindrical body forms an internal spline, wherein the plurality of balancing holes are defined axially through at least a portion of the cylindrical body; and a plurality of external teeth, wherein the plurality of external teeth extend radially outward from the cylindrical body, wherein the plurality of external teeth define a plurality of external tooth gaps, wherein the plurality of external teeth and the plurality of external tooth gaps are defined in a polar array about a center axis of the park lock gear; wherein the rotor shaft forms an external spline, wherein the internal spline meshes with the external spline; wherein the rotor is configured to magnetically couple with a magnetic field causing the rotating assembly to rotate; and wherein the park lock gear, the rotor, the sensor rotor, and the balancing plate are disposed radially outwards of and axially aligned with the rotor shaft, wherein the park lock gear, the rotor, the sensor rotor, and the balancing plate are affixed to and configured to rotate with the rotor shaft, wherein the rotor is disposed axially between the park lock gear and the balancing plate, wherein the park lock gear and the balancing plate are configured to balance the rotating assembly, wherein the park lock gear balances the rotating assembly by the plurality of balancing holes.

In some aspects, the method may include: removing the park lock gear from the rotor shaft; affixing a bearing and a sleeve to the rotor shaft after the park lock gear is removed from the rotor shaft; and affixing the park lock gear to the rotor shaft after the bearing and the sleeve are affixed to the rotor shaft, wherein the rotating assembly includes the bearing and the sleeve, wherein the bearing and the sleeve are disposed radially outwards of and axially aligned with the rotor shaft, wherein the bearing and the sleeve are affixed to and configured to rotate with the rotor shaft, wherein the rotor is disposed axially between the sensor rotor and the balancing plate, wherein the sensor rotor is disposed axially between the bearing and the rotor, wherein the bearing is disposed axially between the sleeve and the sensor rotor, wherein the sleeve is disposed axially between the park lock gear and the bearing.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to rotor assembly balancing using a park lock gear and balancing plate. A rotating assembly may include a rotor, a rotor shaft, a park lock gear, and a balancing plate. The park lock gear and the balancing plate may statically balance and dynamically balance the rotating assembly. The park lock gear may include balancing holes for statically and dynamically balancing the rotating assembly. The balancing holes may extend axially through a select thickness of a cylindrical body of the park lock gear. The rotating assembly may be a component of an electric drive unit. The electric drive unit may include a stator. The rotating assembly may be configured to rotate relative to the stator. The electric drive unit may also include a parking pawl which may lock the rotating assembly to the stator via the park lock gear.

Figure 1A:
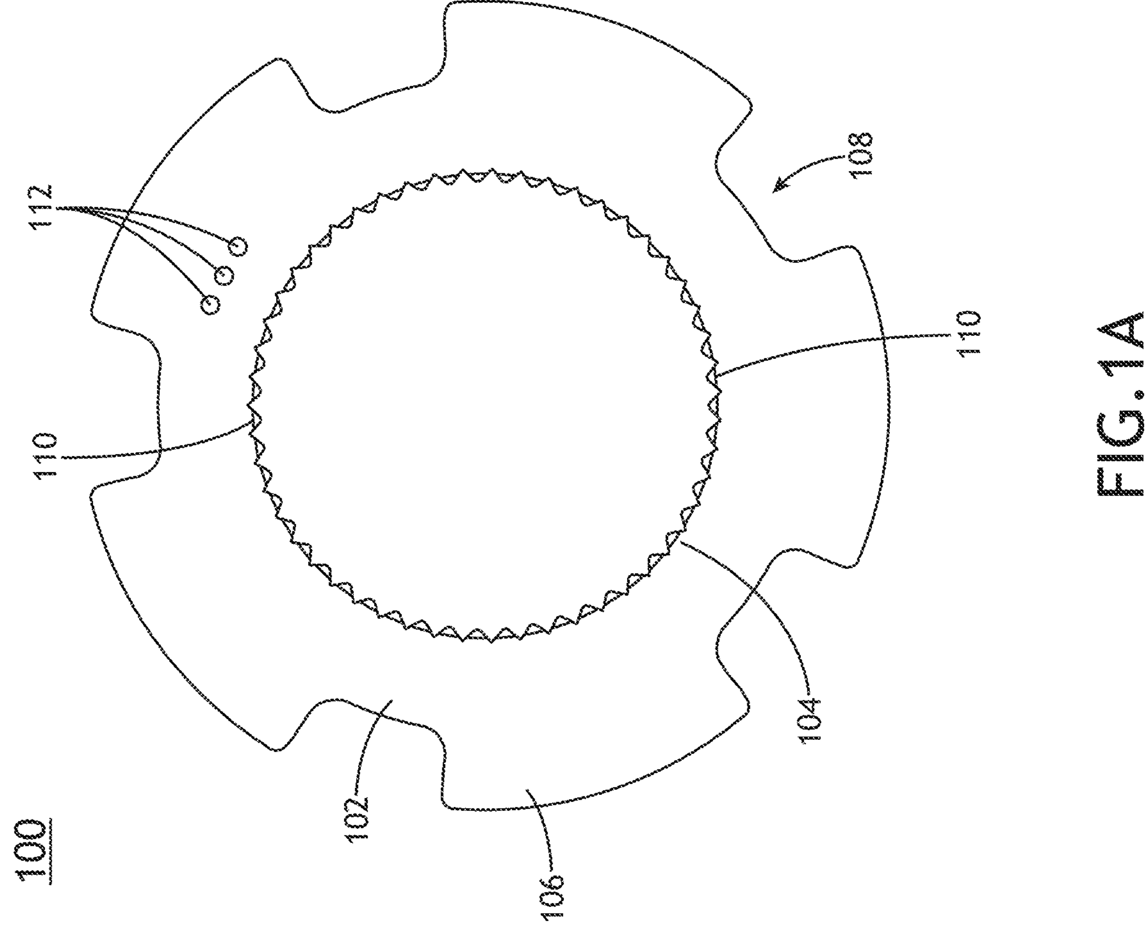
FIG. 1A illustrates a front view of a park lock gear with balancing holes, in accordance with one or more embodiments of the present disclosure.
Figure 1B:
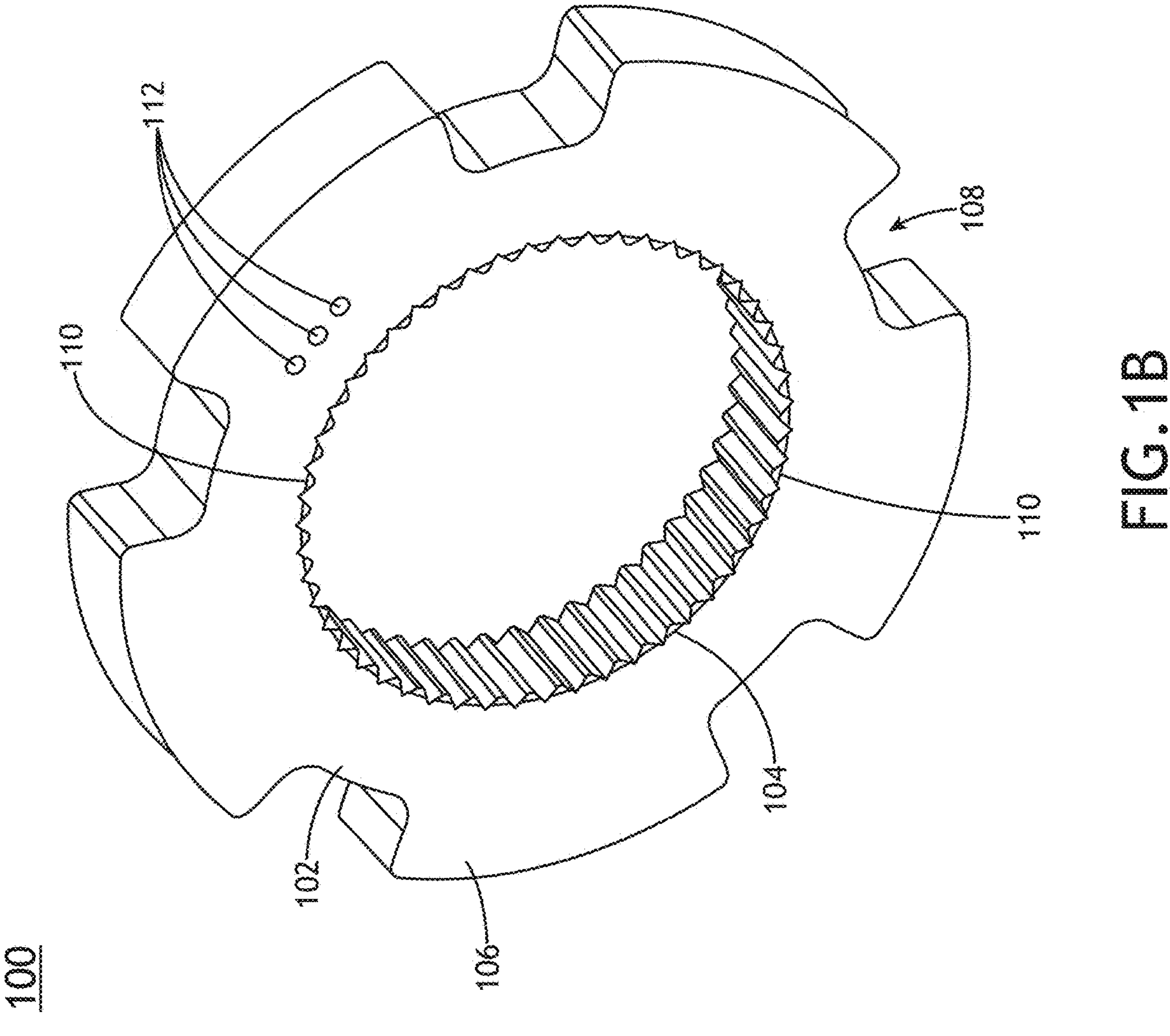
FIG. 1B illustrates a perspective view of the park lock gear, in accordance with one or more embodiments of the present disclosure.

FIGS. 1A-1B illustrate a park lock gear 100, in accordance with one or more embodiments of the present disclosure. The park lock gear 100 may include an internal spline 104, a cylindrical body 102, external teeth 106, external tooth gaps 108, poka-yoke features 110, and/or balancing holes 112.

The internal spline 104 may be formed along the inner diameter of the cylindrical body 102. The internal spline 104 may be considered internal, by being formed along the inner diameter. The internal spline 104 may include a polar array of parallel keys formed along the axial length of the park lock gear 100.

The external teeth 106 and the external tooth gaps 108 may be formed along the external diameter of the cylindrical body 102. The external teeth 106 and the external tooth gaps 108 may be considered external, in that the external teeth 106 and the external tooth gaps 108 are formed along the external diameter. The external teeth 106 may extend radially outward from the cylindrical body 102. The external teeth 106 may define the external tooth gaps 108. The external tooth gaps 108 may be defined circumferentially between the external teeth. The external tooth gaps 108 may each be defined between pairs of the external teeth 106. The external teeth 106 and the external tooth gaps 108 may be defined in a polar array about a center axis of the park lock gear 100. The external teeth 106 and the external tooth gaps 108 may repeat in sequence along the polar array.

The park lock gear 100 may be any suitable type of gear, such as, but not limited to, a ratchet gear. The ratchet gear may also be referred to as a ratchet wheel. The ratchet gear may be a stationary-type ratchet gear. The external teeth 106 and the external tooth gaps 108 may be straight along the axial length of the park lock gear 100. The external teeth 106 and the external tooth gaps 108 may not be configured to transmit continual rotary motion by meshing with a second gear. For example, a top land of the external teeth may be too wide circumferentially to mesh with the second gear. The top land may be the radially outermost surface of the external teeth.

The internal spline 104 may define the poka-yoke features 110. The poka-yoke features 110 may also be referred to as circumferential-alignment features. The poka-yoke features 110 may circumferentially align the park lock gear 100. The poka-yoke features 110 may include, but are not limited to, cuts along one or more teeth of the internal spline 104. The cuts may be along a portion of the axial length of the teeth. For example, the poka-yoke features 110 are depicted as two cuts along teeth which are spaced circumferentially apart (e.g., spaced circumferentially apart by 170° or the like). The angle at which the cuts are spaced circumferentially apart may ensure assembly of the park lock gear 100 in only one orientation.

The balancing holes 112 may also be referred to as compensation holes. The cylindrical body 102 may define the balancing holes 112. The park lock gear 100 may include any integer number of the balancing holes 112. For example, the park lock gear 100 is depicted with three of the balancing holes 112, although this is not intended as a limitation of the present disclosure. The balancing holes 112 may be defined axially through at least a portion of the cylindrical body 102. The balancing holes 112 may be blind-holes or through-holes. In embodiments, the balancing holes 112 are blind-holes. The axial depth of the blind-holes may or may not be the same depth for each of the balancing holes 112. In embodiments, the balancing holes 112 which are blind-holes may each be defined on a same radial face of the cylindrical body 102.

The balancing holes 112 may be disposed at one or more radial positions from a center axis of the park lock gear 100. The balancing holes 112 may be radially aligned with the cylindrical body 102, disposed radially inwards of the external teeth 106, and/or disposed radially outwards of the internal spline 104. The balancing holes 112 may each be radially aligned (e.g., disposed at a same radial position from the center axis) and/or radially offset (e.g., disposed at different radial positions from the center axis). As depicted, the balancing holes 112 are radially aligned. It is contemplated that disposing the balancing holes 112 at the same radial position may be beneficial for ease-of-manufacturing. The balancing holes 112 may be disposed at one or more circumferential positions. For example, the balancing holes 112 may be disposed at circumferential positions defined by an arc segment. The arc segment does not fully revolve around the center axis of the park lock gear 100. The balancing holes 112 may or may not include a spacing between circumferentially adjacent of the balancing holes 112. In this regard, the balancing holes 112 may or may not define as a slot.

Figure 2A:
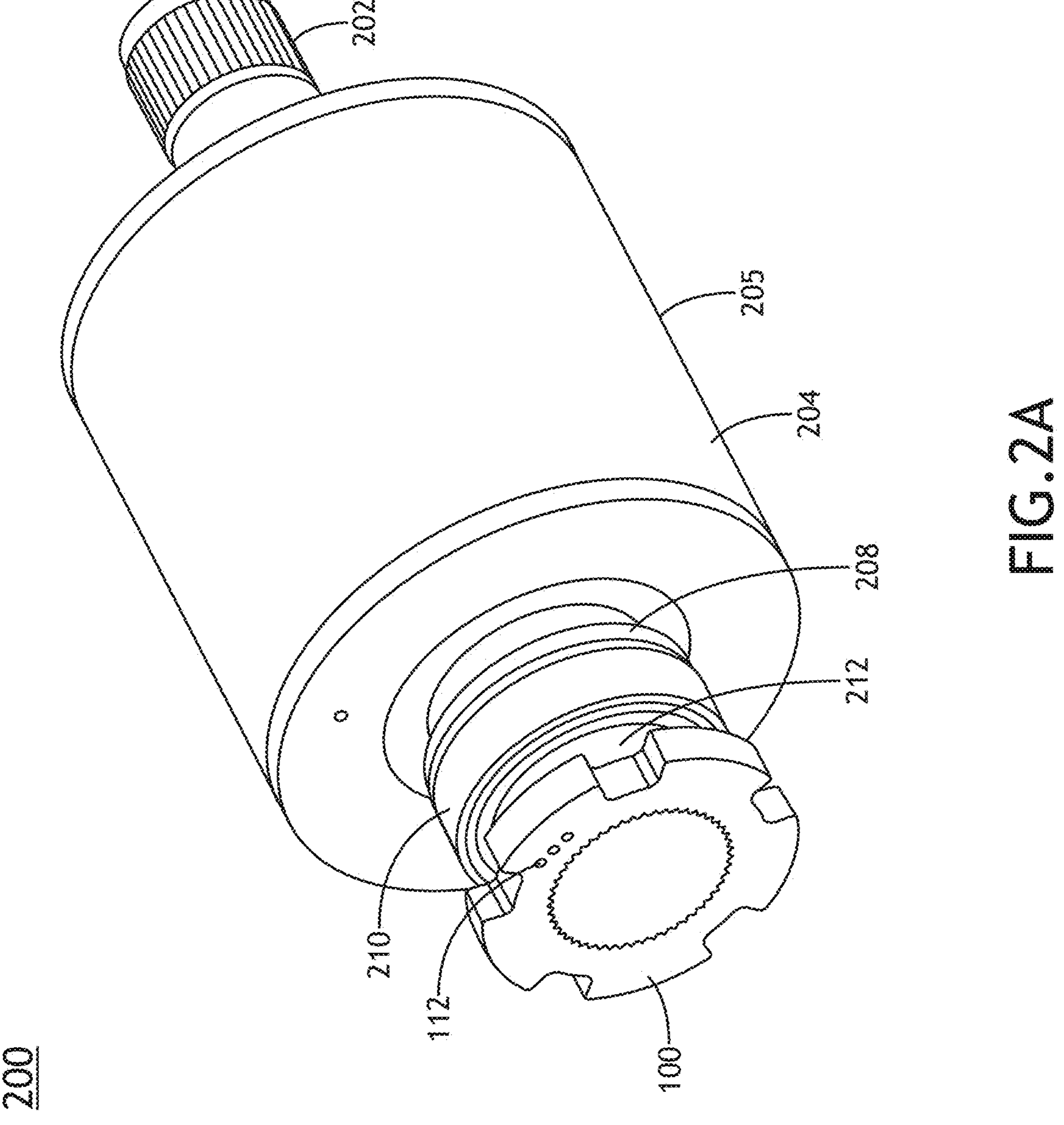
FIG. 2A illustrates a perspective view of a rotating assembly with the park lock gear, in accordance with one or more embodiments of the present disclosure.
Figure 2B:
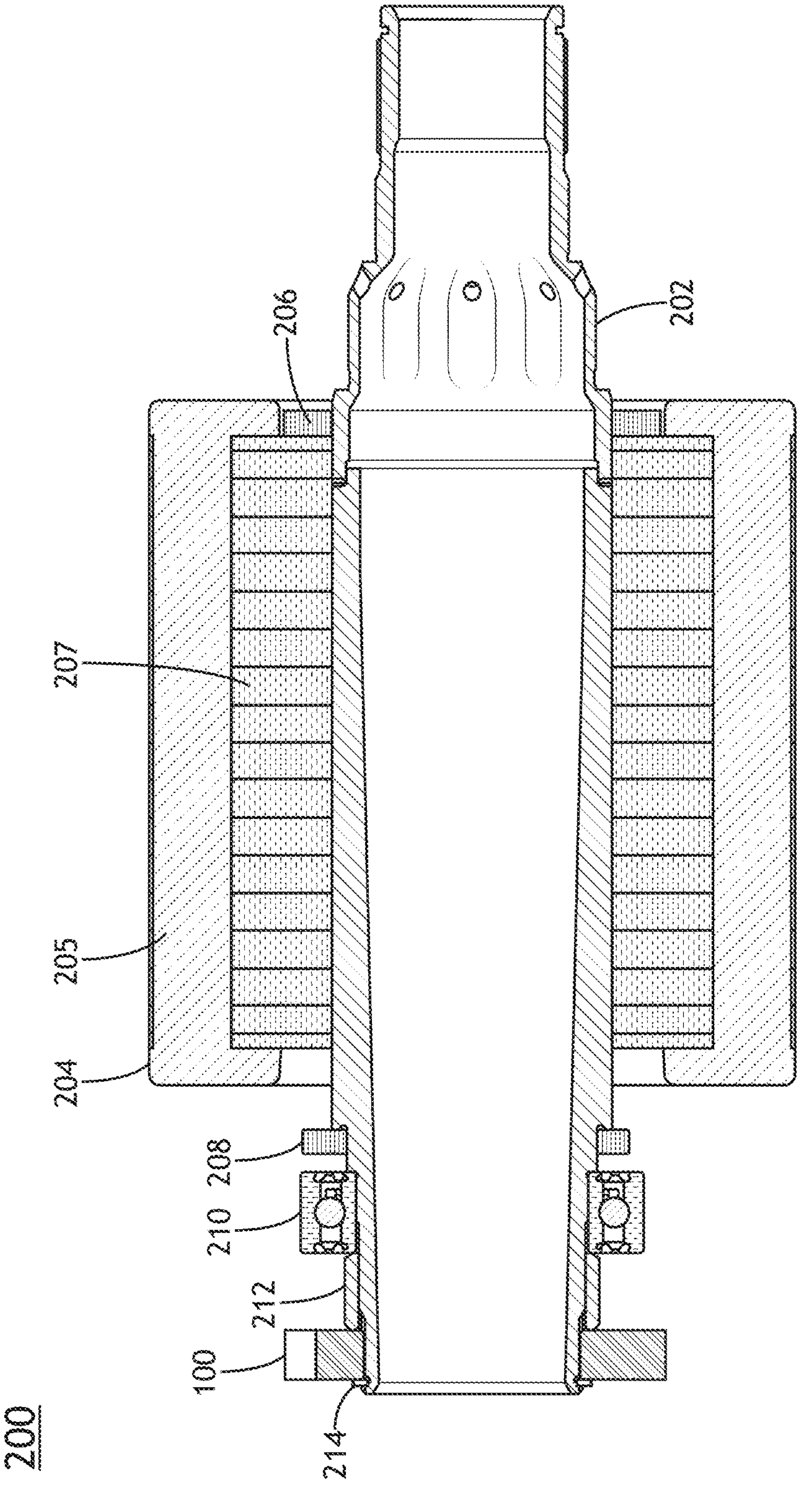
FIG. 2B illustrates a section view of the rotating assembly, in accordance with one or more embodiments of the present disclosure.
Figure 2C:
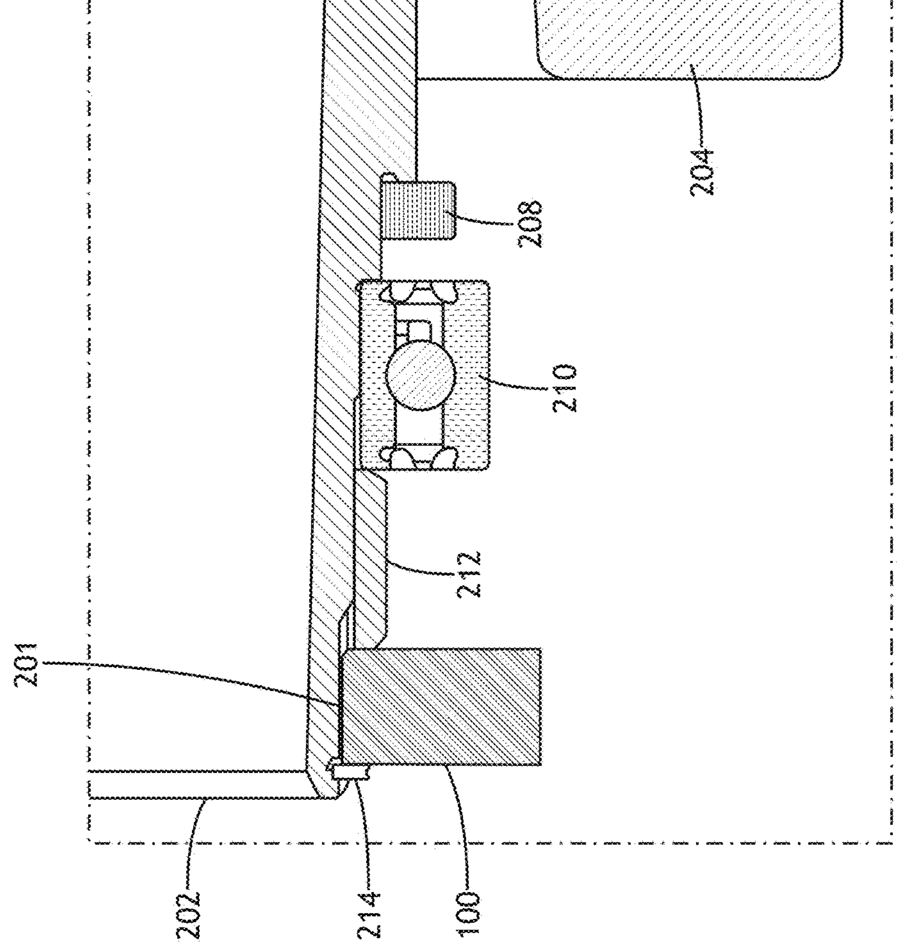
FIG. 2C illustrates a partial view of the section view of FIG. 2B, in accordance with one or more embodiments of the present disclosure.

FIGS. 2A-2C illustrate a rotating assembly 200, in accordance with one or more embodiments of the present disclosure. The rotating assembly 200 may include one or more components, such as, but not limited to, the park lock gear 100, a rotor shaft 202, a rotor 204, a balancing plate 206, a sensor rotor 208, a bearing 210, a sleeve 212, and/or an external snap-ring 214.

The rotating assembly 200 may be configured to rotate about a center axis of the rotating assembly 200. The park lock gear 100, the rotor shaft 202, the rotor 204, the balancing plate 206, the sensor rotor 208, the bearing 210, the sleeve 212, and/or the external snap-ring 214 may include central axes which are concentric to a center axis of the rotating assembly 200. Each of the park lock gear 100, the rotor shaft 202, the rotor 204, the balancing plate 206, the sensor rotor 208, the bearing 210, the sleeve 212, and/or the external snap-ring 214 may rotate with the rotating assembly 200 about the center axis of the rotating assembly 200.

The rotor shaft 202 may be a radially-innermost component of the rotating assembly 200. The park lock gear 100, the rotor 204, the balancing plate 206, the sensor rotor 208, the bearing 210, the sleeve 212, and/or the external snap-ring 214 may be disposed radially outwards of and axially aligned with the rotor shaft 202.

The park lock gear 100, the rotor 204, the balancing plate 206, the sensor rotor 208, the bearing 210, the sleeve 212, and/or the external snap-ring 214 may be affixed to and configured to rotate with the rotor shaft 202. Any of the various components may be affixed to the rotor shaft 202 by any suitable technique, such as, but not limited to, a shrink-fit, a press-fit, a keyway, and/or being staked to the rotor shaft 202. Staking may refer to plastically deforming the rotor shaft 202 into said component or vice-versa.

The balancing plate 206 may be disposed at an axial end of the rotor shaft 202. The balancing plate 206 may be disposed adjacent to the rotor 204 on the rotor shaft 202. The balancing plate 206 may or may not axially retain the rotor 204 on the rotor shaft 202.

The rotor 204 may be disposed axially between on a first axial side the balancing plate 206 and on a second axial side the sensor rotor 208, the bearing 210, the sleeve 212, the park lock gear 100, and/or the external snap-ring 214. For example, the rotor 204 may be immediately disposed axially between the sensor rotor 208 and the balancing plate 206.

The rotor 204 may include a rotor carrier 205 and/or a rotor core 207. The rotor carrier 205 may clamp together the rotor core 207. The rotor core 207 may be disposed radially inwards of and axially aligned with the rotor carrier 205. The rotor core 207 may be affixed to the rotor carrier 205 and/or to the rotor shaft 202. For example, the rotor core 207 may be affixed to rotor carrier 205 by a keyway and to the rotor shaft 202 by a shrink-fit, although this is not intended to be limiting.

The rotor 204 may magnetically couple with a magnetic field causing the rotating assembly 200 to rotate. The rotor core 207 may include stacks of lamination and permanent magnets (not depicted). The stacks of lamination may be laminated steel. The permanent magnets may be disposed within cavities defined by the stacks of lamination. The permanent magnets may define pole-pairs of the rotor core 207. For example, pairs of the permanent magnets may be arranged in a V-shape. The V-shape may define one-half of a pole-pair of the rotor core 207. Two sets of the pairs of the permanent magnets may then define one pole-pair of the rotor core 207. Each of the pole-pairs of the rotor core 207 may be associated with one electrical rotation of the rotating assembly 200. The permanent magnets may also be circumferentially skewed along the axial length of the rotor core 207. The permanent magnets may be circumferentially skewed by a skew angle. The circumferential skew along the axial length may be beneficial to change the position of the poles along the axial length (e.g., for reducing torque ripple). The permanent magnets of the rotor core 207 may magnetically couple with a magnetic field, causing the rotating assembly 200 to rotate about the center axis.

The sensor rotor 208 may be disposed axially between on a first axial side the balancing plate 206 and/or the rotor 204 and on a second axial side the bearing 210, the sleeve 212, the park lock gear 100, and/or the external snap-ring 214. For example, the sensor rotor 208 may be disposed immediately between the rotor 204 and the bearing 210.

The sensor rotor 208 may be used for sensing the rotary position of the rotating assembly 200.

The bearing 210 may be disposed axially between on a first axial side the balancing plate 206, the rotor 204, and/or the sensor rotor 208 and on a second axial side the sleeve 212, the park lock gear 100, and/or the external snap-ring 214. For example, the bearing 210 may be disposed immediately between the sensor rotor 208 and the sleeve 212.

The bearing 210 may be any suitable bearing, such as, but not limited to, plain bearings (e.g., bushings), rolling-element bearings, cylindrical bearings, ball bearings, roller bearings, needle bearings, or the like. The bearing 210 may support a radial load and/or an axial load. For example, the bearing 210 may be a rolling-element bearing which is configured to support the radial load and which includes an inner race which is affixed to the rotor shaft 202 and an outer race which is configured to rotate relative to the inner race.

The sleeve 212 may be disposed axially between on a first axial side the balancing plate 206, the rotor 204, the sensor rotor 208, and/or the bearing 210 and on a second axial side the park lock gear 100 and/or the external snap-ring 214. For example, the sleeve 212 may be disposed immediately between the bearing 210 and the park lock gear 100.

The sleeve 212 may be an axial spacer between the park lock gear 100 and the bearing 210. For example, the sleeve 212 may be a dead-stop for the park lock gear 100 when assembling the park lock gear 100 axially onto the rotor shaft 202.

The park lock gear 100 may be disposed axially between on a first axial side the balancing plate 206, the rotor 204, the sensor rotor 208, the bearing 210, and/or the sleeve 212 and on a second axial side the external snap-ring 214. For example, the park lock gear 100 may be disposed immediately between the sleeve 212 and the external snap-ring 214.

The rotor shaft 202 may form an external spline 201. The external spline 201 may be formed along an outer diameter of the rotor shaft 202. The internal spline 104 may mesh with the external spline 201 of the rotor shaft 202. The poka-yoke features 110 may circumferentially-align the internal spline 104 with the external spline 201 such that the internal spline 104 and the external spline 201 may mesh at only one orientation. Thus, the poka-yoke features 110 may ensure the park lock gear 100 is assembled onto the rotor shaft 202 in a proper orientation after balancing via the balancing holes 112. The external spline 201 may include a feature (not depicted) which may radially extend into the poka-yoke features 110.

The park lock gear 100 may be configured to lock the rotation of the rotating assembly 200 thereby preventing the rotation of the rotating assembly 200 and unlock the rotating assembly 200 thereby allowing the rotation of the rotating assembly 200.

The park lock gear 100 and/or the balancing plate 206 may balance the rotating assembly 200. The park lock gear 100 and/or the balancing plate 206 may statically balance and/or dynamically balance the rotating assembly 200. The park lock gear 100 and/or the balancing plate 206 may compensate for a static imbalance and/or a dynamic imbalance of the rotating assembly 200. A static imbalance may refer to the center of mass of the rotating assembly 200 being radially offset from the center axis. A dynamic imbalance may refer to a principal axis of a moment of inertia of the rotating assembly 200 being rotationally skewed from the center axis of the rotating assembly 200. For example, the mass distribution of the rotor shaft 202, the rotor 204, and/or the sensor rotor 208 may be radially offset from the center axis of the rotating assembly 200, shifting the center of gravity of and/or principal axis of the moment of inertia of the rotating assembly 200 from the center axis and causing the static and/or dynamic imbalance. The mass distribution of the park lock gear 100 and/or the balancing plate 206 may compensate for the static imbalance and/or the dynamic imbalance of the rotating assembly 200 by aligning the center of gravity of the rotating assembly 200 with the center axis and/or causing the principal axis of the moment of inertia of the rotating assembly 200 to be parallel with the center axis of the rotating assembly 200. In this regard, the rotating assembly 200 may be statically balanced and/or dynamically balanced by the park lock gear 100 and/or the balancing plate 206.

The park lock gear 100 may balance the rotating assembly 200 by the balancing holes 112. For example, the park lock gear 100 may statically balance and/or dynamically balance the rotating assembly 200 by the balancing holes 112. The balancing holes 112 may statically imbalance and/or dynamically imbalance the park lock gear 100 by itself while at the same time statically balance and/or dynamically balance the rotating assembly 200 when affixed to the rotor shaft 202. Balancing the rotating assembly 200 may be beneficial to reduce or prevent vibration of the rotating assembly 200. The balancing plate 206 may also include the balancing holes 112 for statically balancing and/or dynamically balancing the rotating assembly 200.

The number, the radial position, the circumferential position, the circumferential spacing between, the diameter, and/or the depth of the balancing holes 112 may be selected to provide the static balance and the dynamic balance for the rotating assembly 200. In embodiments, the diameter, and/or the radial position of the balancing holes 112 is fixed while the number, the circumferential position, the circumferential spacing between, and/or the depth of the balancing holes 112 may be selected to provide the static balance and the dynamic balance for the rotating assembly 200. In this embodiment, the balancing holes 112 may include a same diameter may be radially aligned.

The external snap-ring 214 may be disposed at an axial end of the rotor shaft 202. The external snap-ring 214 may also be referred to as a circlip, a C-clip, or the like. The external snap-ring 214 may be affixed to a groove in the rotor shaft 202. The external snap-ring 214 may axially retain the park lock gear 100 on the rotor shaft 202. For example, the external snap-ring 214 may prevent the park lock gear 100 from flying axially off the rotor shaft 202 when subject to high revolutions-per-minute.

Figure 3A:
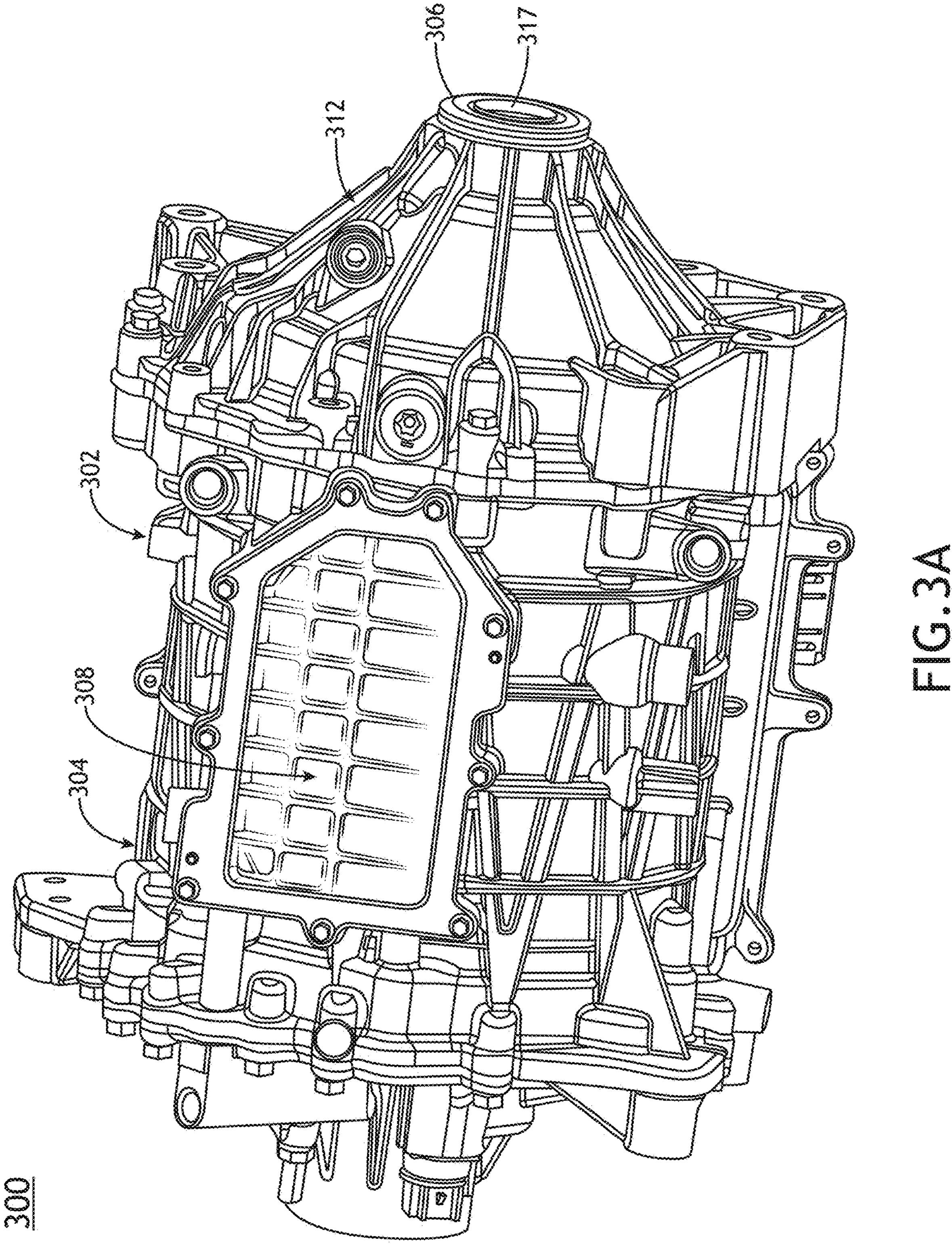
FIG. 3A illustrates a perspective view of an electric drive unit with the rotating assembly, in accordance with one or more embodiments of the present disclosure.
Figure 3B:
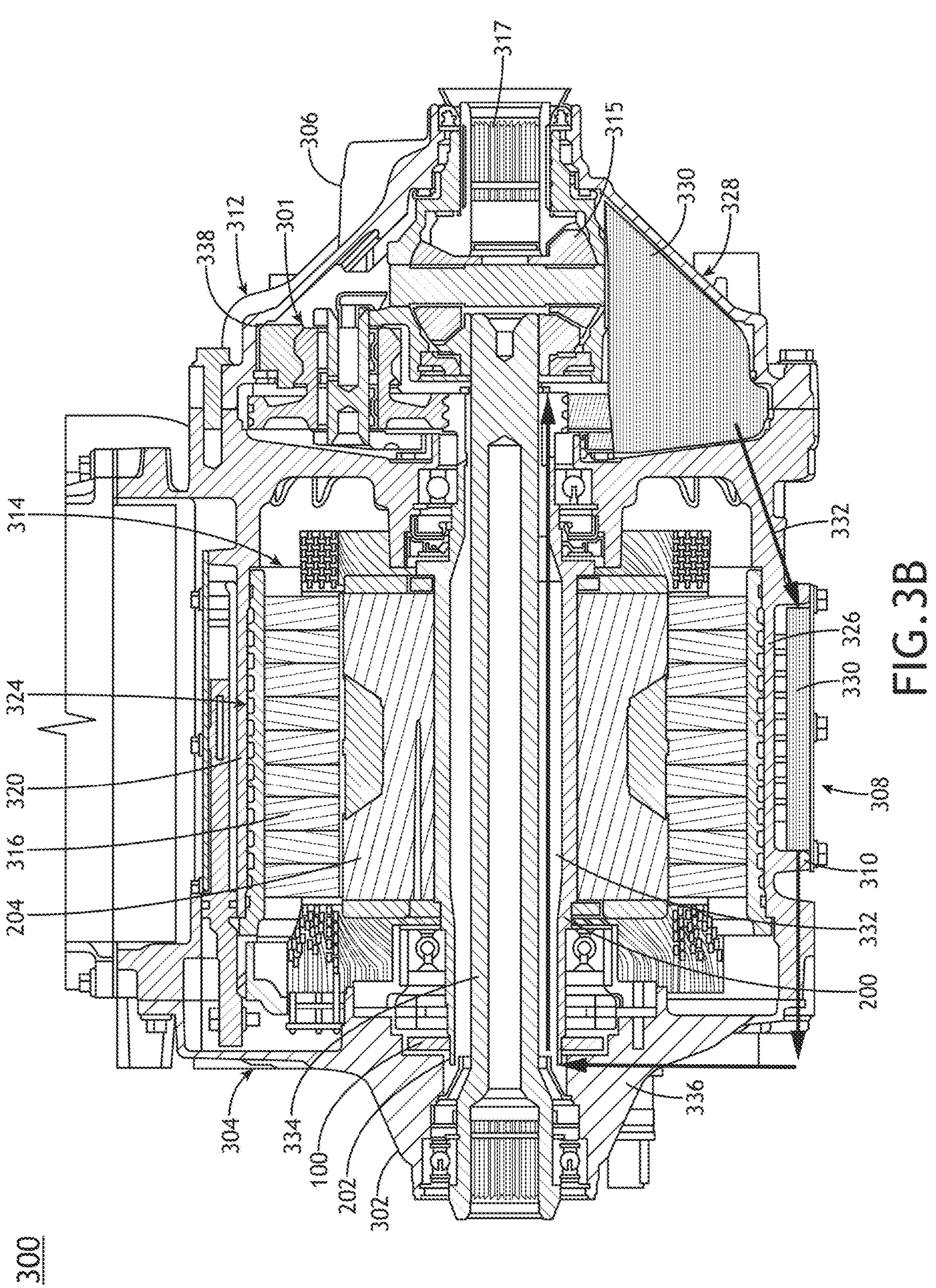
FIG. 3B illustrates a section view of the electric drive unit, in accordance with one or more embodiments of the present disclosure.
Figure 3C:
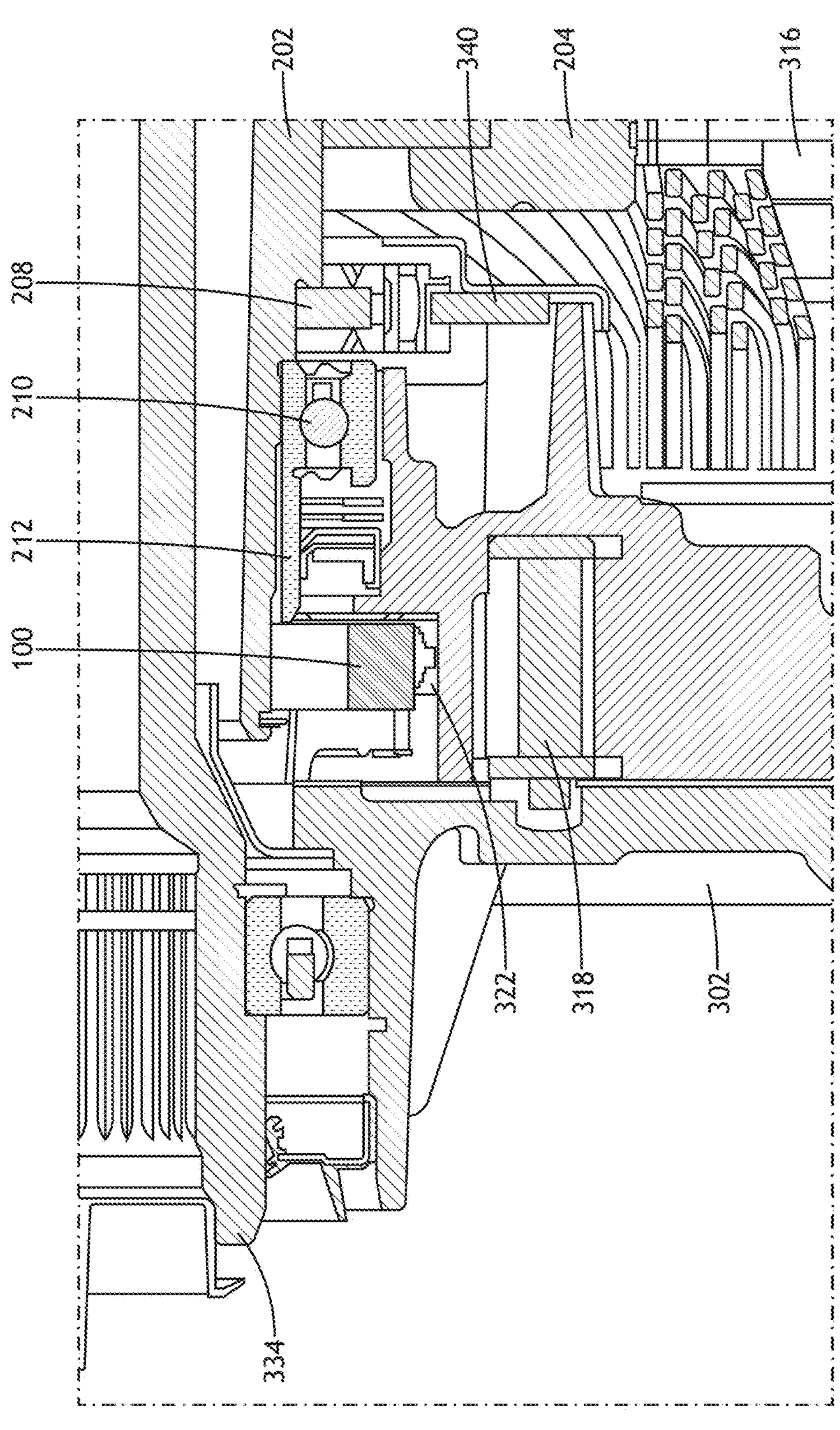
FIG. 3C illustrates a partial section view of the electric drive unit to illustrate the park lock gear of the rotating assembly engaging with a park lock pawl, in accordance with one or more embodiments of the present disclosure.

FIGS. 3A-3C depict an electric drive unit 300, in accordance with one or more embodiments of the present disclosure. The electric drive unit 300 ("EDU") may be an electric axle ("e-axle"). The electric drive unit 300 may include the rotating assembly 200. The electric drive unit 300 may also include one or more other components, such as, but not limited to, a planetary gearset 301, a housing 302, a motor housing 304, a gearbox 306, a heat exchanger 308, a fluid chamber 310, a gearbox housing 312, an electric motor 314, a stator 316, a park lock pawl 318, a stator carrier 320, a pawl tooth 322, a stator fluid jacket 324, a fluid chamber bottom wall 326, a gearbox sump 328, a fluid 330, a fluid circuit 332, an output shaft 334, a passage 336, a ring gear 338, and/or a sensor stator 340.

The housing 302 may be a cast aluminum housing. The housing 302 may be formed in multiple parts. The housing 302 can be functionally divided into the motor housing 304 and the gearbox housing 312. The gearbox housing 312 may be affixed to the motor housing 304 using one or more fasteners (not depicted).

The gearbox 306 may include the planetary gearset 301, the gearbox housing 312, the gearbox sump 328, and the ring gear 338. The gearbox housing 312 may house the planetary gearset 301. The gearbox housing 312 may define the gearbox sump 328 and the ring gear 338. The ring gear 338 may also be referred to as an annulus. The gearbox sump 328 may be disposed radially outwards of and axially aligned with the planetary gearset 301. A portion of the planetary gearset 301 may radially extend into the gearbox sump 328. The gearbox housing 312 may define the gearbox sump 328. The gearbox sump 328 may be disposed at a bottom of the gearbox 306. The gearbox sump 328 may be a fluid reservoir. The gearbox sump 328 may hold the fluid 330. The fluid 330 may include oil or another fluid. The ring gear 338 may be disposed radially outwards and axially aligned with planet gears of the planetary gearset 301. The planet gears may engage with the ring gear 338.

The heat exchanger 308 may be integrated, or integral with, the motor housing 304. That is, the existing planned casting process for the motor housing 304 may be used to form the heat exchanger 308. The heat exchanger 308 may be located on one or more sides of the electric drive unit 300. The heat exchanger 308 may be disposed radially outwards of the electric motor 314. A fluid chamber 310 of the heat exchanger 308 may be formed in an outer surface (for example, by casting) of the motor housing 304.

The motor housing 304 may house the electric motor 314. The electric motor 314 may be a dynamo-electric machine which converts electrical energy to mechanical energy by electromagnetic means. The electric motor 314 may include the rotating assembly 200, the rotor 204, the stator 316, and/or the stator carrier 320.

The stator 316 may include the stator carrier 320. The stator 316 may be affixed to the motor housing 304. The stator 316 may be disposed radially outwards of and axially aligned with the rotor 204. The stator 316 may be disposed radially inwards of and axially aligned with the heat exchanger 308.

The stator carrier 320 may be a housing for the components of the stator 316. The stator carrier 320 may encapsulate a stator core, a stator winding, and the like. The stator core may be made of stacks of one or more stacks of lamination. The stator core may define one or more slots for the winding. The winding of the stator 316 may disposed in the slots of the stator core.

The rotor 204 may be disposed within a center axis of the stator 316. The rotating assembly 200 may be configured to rotate relative to the stator 316. The magnetic field induced by the stator 316 may cause the rotating assembly 200 to rotate relative to the stator 316. The rotating assembly 200 may be supported by and configured to rotate relative to the stator 316 via the bearing 210. The rotor 204 may perform work on one or more external components via the rotation of the rotating assembly 200. The rotor shaft 202 may engage to a sun gear of the planetary gearset 301. The electric motor 314 may drive the sun gear of the planetary gearset 301 via the rotor shaft 202.

The park lock gear 100 may be configured to lock and unlock the rotating assembly 200 to and from the stator 316 via the park lock pawl 318. The park lock gear 100 and the park lock pawl 318 may form a park lock assembly. The park lock pawl 318 may engage with the park lock gear 100. For example, the park lock pawl 318 may include the pawl tooth 322. The pawl tooth 322 may be circumferentially aligned with and disposed radially outwards of the park lock gear 100. The park lock pawl 318 may be configured to translate the pawl tooth 322 radially inwards to engage with one of the external tooth gaps 108 and radially outwards to disengage from the one of the external tooth gaps 108. The engagement of the pawl tooth 322 with one of the external tooth gaps 108 may lock the park lock gear 100 and the rotating assembly 200 to the stator 316 and/or the housing 302 and prevent rotation relative thereto. The disengagement of the pawl tooth 322 from one of the external tooth gaps 108 may unlock the park lock gear 100 and the rotating assembly 200 from the stator 316 and/or the housing 302 and allow rotation relative thereto.

The external tooth gaps 108 may be configured to receive the pawl tooth 322 for engaging the pawl tooth 322 with the external tooth gaps 108. The pawl tooth 322 may lock the rotation of the park lock gear 100 about the center axis when the pawl tooth 322 is received by the one of the external tooth gaps 108. The pawl tooth 322 may prevent the park lock gear 100 from rotating in either direction, so long as the pawl tooth 322 engages with the external tooth gaps 108. Additionally, a pressure angle of the external teeth 106 may be close to 0-degrees to prevent the pawl tooth 322 from slipping from the external tooth gaps 108.

The park lock pawl 318 may include an actuator (not depicted) which may translate the pawl tooth 322 radially inwards and radially outwards. For example, the actuator may translate the pawl tooth 322 radially inwards and radially outwards by pivoting and/or rotating the pawl tooth 322.

The electric drive unit 300 may be a coaxial rotor system. The output shaft 334 may be disposed radially inwards of and axially aligned with the rotor shaft 202. The output shaft 334 may be engaged with the rotating assembly 200 via a differential 315 of the planetary gearset 301. The output shaft 334 may axially extend through the rotor shaft 202 and engage with the differential 315.

The electric drive unit 300 may be utilized in a vehicle, such as an electric vehicle or a hybrid electric vehicle. A pair of wheels of a vehicle's drivetrain may be coupled to opposing ends of the differential 315. For example, the pair of wheels may be coupled to opposing ends of the differential 315 via the internal spline 317 of the differential 315 and via the output shaft 334. The differential 315 may enabling turning the wheels at independent speeds for cornering. Thus, the electric drive unit 300 may be a portion of an electric axle of the vehicle.

The fluid 330 may flow in the fluid circuit 332 from the gearbox sump 328, through the heat exchanger 308, through the passage 336, along the rotor shaft 202, and back to the gearbox sump 328.

The gearbox 306 may collect and distribute the fluid 330 from the gearbox sump 328 to the heat exchanger 308. A portion of the pumping action may also be performed via centrifugal pumping.

The heat exchanger 308 may receive and cool the fluid 330. The heat exchanger 308 may cool the fluid 330 with a coolant fluid that is disposed on the opposing side of the fluid chamber bottom wall 326 within the stator fluid jacket 324. The stator 316 may include a stator fluid jacket 324 formed, and bounded, by the stator carrier 320 and a fluid chamber bottom wall 326 of the fluid chamber 310. The stator fluid jacket 324 may be formed by the stator carrier 320 and the fluid chamber bottom wall 326. The stator carrier 320 and the fluid chamber bottom wall 326 may form an inner wall and an outer wall, respectively, of the stator fluid jacket 324. The stator fluid jacket 324 may be filled with a coolant fluid. The coolant fluid may also be referred to as coolant, antifreeze, or the like. The coolant fluid may include a water-glycol mixture, for example. The coolant fluid may be for cooling of the stator 316 and for cooling the fluid 330 that is disposed within the fluid chamber 310 of the heat exchanger 308. The heat exchanger 308 may use the stator fluid jacket 324 to cool the fluid 330 within the fluid chamber 310. The fluid chamber bottom wall 326 may be in contact with the stator fluid jacket 324 volume on an inner surface and is in contact with the fluid from the heat exchanger 308 on an outer surface and functions as a "cool wall". The contact may also allow heat exchanging of the fluid 330 without added fluid pressure losses or the addition of additional circuits. The cavity defined by the stator fluid jacket 324 can be filled with a water-glycol mixture and the fluid chamber 310 of the heat exchanger 308 can be filled with the fluid 330. It is contemplated that a variety of different types of fluids can be utilized within the cavity defined by the stator fluid jacket 324 and the fluid chamber 310.

The fluid 330 may be routed from the heat exchanger 308 to the rotor shaft 202. The fluid 330 may be routed to the rotor shaft 202 along the fluid circuit 332 in the housing 302. The fluid 330 may be routed along the fluid circuit 332 to the rotor shaft 202 via a passage 336 formed in the housing 302. The passage 336 is in fluid communication with the rotor shaft 202 such that fluid flowing through the passage 336 exits the passage 336 into a cavity defined between the rotor shaft 202 and the output shaft 334.

The fluid 330 may flow along the inner diameter of the rotor shaft 202 and along the outer diameter of the output shaft 334. The fluid 330 may be exposed to both the rotor shaft 202 and the output shaft 334. In the coaxial system, the fluid 330 is delivered into a hollow defined by the rotor shaft 202 and the output shaft 334. The fluid 330 may provide cooling of the rotor shaft 202. The fluid 330 may then return from the end of the rotor shaft 202 to the gearbox sump 328. For example, the fluid 330 may return from the end of the rotor shaft 202 via a drilled passage between the motor housing 304 and the planetary gearset 301 and/or a gap between the output shaft 334 and the rotor shaft 202.

The sensor stator 340 may be axially aligned with and disposed radially outwards of the sensor rotor 208. The sensor stator 340 may be configured to sense the rotary position of the rotating assembly 200 via the sensor rotor 208. The sensor rotor 208 and the sensor stator 340 may form a sensor assembly. The sensor assembly may sense an angular position, a rotational speed, or the like. The sensor assembly may be a resolver, a variable-reluctance sensor, a hall-effect, an eddy current sensor, or the like.

Figure 4:
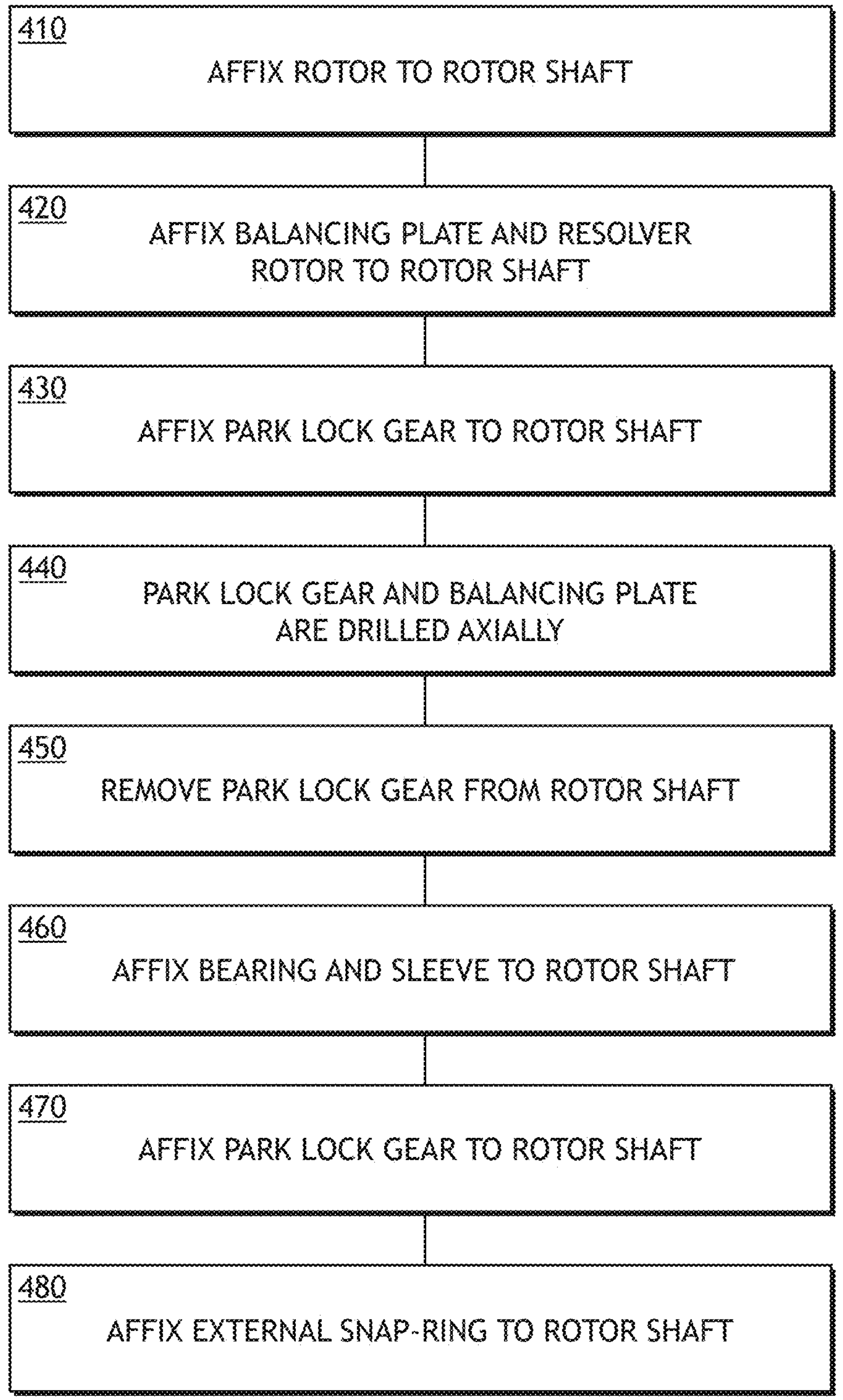
FIG. 4 illustrates a flow diagram of a method of assembling the rotating assembly, in accordance with one or more embodiments of the present disclosure.

FIG. 4 illustrates a flow diagram of a method 400, in accordance with one or more embodiments of the present disclosure. The method 400 may be a method of assembling the electric drive unit 300. The embodiments and enabling technologies described previously herein in the context of the electric drive unit 300 should be interpreted to extend to method 400. It is further noted, however, that the method is not limited to the architecture of the electric drive unit 300.

In a step 410, a rotor may be affixed to a rotor shaft. For example, the rotor 204 may be affixed to the rotor shaft 202. The rotor 204 may be affixed to the rotor shaft 202 by shrink-fitting the rotor core 207 onto the rotor shaft 202.

In a step 420, a balancing plate and a sensor rotor may be affixed to the rotor shaft. For example, the balancing plate 206 and the sensor rotor 208 may be affixed to the rotor shaft 202. The balancing plate 206 and the sensor rotor 208 may be affixed to the rotor shaft 202 at opposing axial sides of the rotor 204, with the rotor 204 disposed therebetween.

In a step 430, a park lock gear may be affixed to the rotor shaft. For example, the park lock gear 100 may be affixed to the rotor shaft 202. The park lock gear 100 may be affixed to the rotor shaft 202 without fully pressing the park lock gear 100 onto the external spline 201, because the park lock gear 100 is removed from the rotor shaft 202 in a subsequent step in the method 400. Additionally, the park lock gear 100 is affixed to the rotor shaft 202 before the bearing 210 and the sleeve 212.

In a step 440, the park lock gear and the balancing plate may be axially drilled to balance the rotating assembly. For example, the park lock gear 100 and the balancing plate 206 may be axially drilled to balance the rotating assembly 200. The axially drilling may form the balancing holes 112. A balancing machine may axially drill the balancing holes 112. The balancing machine may measure the static imbalance and dynamic imbalance of the rotating assembly 200 and drill the balancing holes 112 to compensate for the static imbalance and dynamic imbalance. The balancing holes 112 may be formed axially and not radially. Forming the balancing holes 112 axially may be beneficial to maintain a strength of the park lock gear 100 and/or due to constraints associated with the balancing machine.

The balancing holes 112 may be formed before the bearing 210 and the sleeve 212 are affixed to the rotor shaft 202. The bearing 210 and/or the sleeve 212 may induce error in the balancing, such that the balancing holes 112 are formed before the bearing 210 and the sleeve 212 are affixed to the rotor shaft 202.

In a step 450, the park lock gear may be removed from the rotor shaft. For example, the park lock gear 100 may be removed from the rotor shaft 202.

In a step 460, a bearing and a sleeve may be affixed to the rotor shaft. For example, the bearing 210 and the sleeve 212 may be affixed to the rotor shaft 202.

In a step 470, the park lock gear may be affixed to the rotor shaft. For example, the park lock gear 100 may be affixed to the rotor shaft 202. The internal spline 104 of the park lock gear 100 may be fully pressed onto the external spline 201 of the rotor shaft 202. The poka-yoke features 110 may ensure that the park lock gear 100 is affixed to the rotor shaft 202 in a same orientation as the previous orientation when the balancing holes 112 were formed in the park lock gear 100 to maintain the static balance and the dynamic balance of the rotating assembly 200.

In a step 480, an external snap-ring may be affixed to the rotor shaft. For example, the external snap-ring 214 may be affixed to the rotor shaft 202.

Referring generally again to the figures. Balancing the rotating assembly 200 with the balancing holes 112 in the park lock gear 100 may be beneficial to remove an additional balancing plate which is axially disposed between the rotor 204 and the sensor rotor 208. Additionally, balancing the rotating assembly 200 with the balancing holes 112 in the park lock gear 100 may be beneficial to balance the rotating assembly 200 after the rotating assembly 200 has the mass of the sensor rotor 208 added.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, the term “axial” and derivatives thereof, such as “axially,” shall be understood to refer to a direction along the axis. The term “coaxial” shall be understood to refer to a common axis. Further, the term “radial” and derivatives thereof, such as “radially,” shall be understood in relation to the axis. For example, “radially outward” refers to further away from the axis, while “radially inward” refers to nearer to the axis. The term “circumference” or derivatives thereof, such as “circumferentially”, may also be defined in reference to the center axis.

As used herein, directional terms such as “top,” “bottom,” “over,” “under,” “upper,” “upward,” “lower,” “down,” and “downward” are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 park lock gear
102 cylindrical body
104 internal spline
106 external teeth
108 external tooth gaps
110 poka-yoke features
112 balancing holes
200 rotating assembly
201 external spline
202 rotor shaft
204 rotor
205 rotor carrier
206 balancing plate
207 rotor core
208 sensor rotor
210 bearing
212 sleeve
214 external snap-ring
300 electric drive unit

301 planetary gearset
302 housing
304 motor housing
306 gearbox
308 heat exchanger
310 fluid chamber
312 gearbox housing
314 electric motor
315 differential
316 stator
317 internal spline
318 park lock pawl
320 stator carrier
322 pawl tooth
324 stator fluid jacket
326 fluid chamber bottom wall
328 gearbox sump
330 fluid
332 fluid circuit
334 output shaft
336 passage
338 ring gear
340 sensor stator
400 method
410 step
420 step
430 step
440 step
450 step
460 step
470 step
480 step

What is claimed:

1. A rotating assembly comprising:
a park lock gear, wherein the park lock gear comprises:
a cylindrical body, wherein the cylindrical body forms an internal spline, wherein a plurality of balancing holes are defined axially through at least a portion of the cylindrical body; and
a plurality of external teeth, wherein the plurality of external teeth extend radially outward from the cylindrical body, wherein the plurality of external teeth define a plurality of external tooth gaps, wherein the plurality of external teeth and the plurality of external tooth gaps are defined in a polar array about a center axis of the park lock gear;
a rotor shaft, wherein the rotor shaft forms an external spline, wherein the internal spline meshes with the external spline;
a rotor, wherein the rotor is configured to magnetically couple with a magnetic field causing the rotating assembly to rotate;
a sensor rotor; and
a balancing plate, wherein the park lock gear, the rotor, the sensor rotor, and the balancing plate are disposed radially outwards of and axially aligned with the rotor shaft, wherein the park lock gear, the rotor, the sensor rotor, and the balancing plate are affixed to and configured to rotate with the rotor shaft, wherein the rotor is disposed axially between the park lock gear and the balancing plate, wherein the park lock gear and the balancing plate are configured to balance the rotating assembly, wherein the park lock gear balances the rotating assembly by the plurality of balancing holes.

2. The rotating assembly of claim 1, wherein the park lock gear and the balancing plate statically balance and dynamically balance the rotating assembly.

3. The rotating assembly of claim 1, wherein the park lock gear is a ratchet gear, wherein the plurality of external teeth and the plurality of external tooth gaps are straight along an axial length of the park lock gear.

4. The rotating assembly of claim 1, wherein the plurality of balancing holes are one of blind-holes or through-holes.

5. The rotating assembly of claim 4, wherein the plurality of balancing holes are blind-holes, wherein the plurality of balancing holes are each defined on a same radial face of the cylindrical body.

6. The rotating assembly of claim 5, wherein an axial depth of the plurality of balancing holes is a same depth for each of the plurality of balancing holes.

7. The rotating assembly of claim 5, wherein the plurality of balancing holes are radially aligned.

8. The rotating assembly of claim 7, wherein the plurality of balancing holes are disposed at circumferential positions defined by an arc segment, wherein the arc segment does not fully revolve around the center axis of the park lock gear.

9. The rotating assembly of claim 7, wherein the plurality of balancing holes include a spacing between circumferentially adjacent of the plurality of balancing holes such that the plurality of balancing holes do not define a slot.

10. The rotating assembly of claim 1, wherein the park lock gear comprises one or more poka-yoke features, wherein the one or more poka-yoke features are configured to circumferentially align the internal spline with the external spline such that the internal spline and the external spline mesh at only one orientation.

11. The rotating assembly of claim 10, wherein the internal spline defines the one or more poka-yoke features, wherein the one or more poka-yoke features comprise one or more cuts along one or more teeth of the internal spline.

12. The rotating assembly of claim 1, wherein the rotor is disposed axially between the sensor rotor and the balancing plate, wherein the sensor rotor is disposed axially between the park lock gear and the rotor.

13. The rotating assembly of claim 12, comprising:
a bearing; and
a sleeve, wherein the bearing and the sleeve are disposed radially outwards of and axially aligned with the rotor shaft, wherein the bearing and the sleeve are affixed to and configured to rotate with the rotor shaft, wherein the rotor is disposed axially between the sensor rotor and the balancing plate, wherein the sensor rotor is disposed axially between the bearing and the rotor, wherein the bearing is disposed axially between the sleeve and the sensor rotor, wherein the sleeve is disposed axially between the park lock gear and the bearing.

14. The rotating assembly of claim 1, wherein the park lock gear is configured to lock and unlock rotation of the rotating assembly.

15. An electric drive unit comprising:
a rotating assembly comprising:
a park lock gear, wherein the park lock gear comprises:
a cylindrical body, wherein the cylindrical body forms an internal spline, wherein a plurality of balancing holes are defined axially through at least a portion of the cylindrical body; and
a plurality of external teeth, wherein the plurality of external teeth extend radially outward from the cylindrical body, wherein the plurality of external teeth define a plurality of external tooth gaps, wherein the plurality of external teeth and the plurality of external tooth gaps are defined in a polar array about a center axis of the park lock gear;

a rotor shaft, wherein the rotor shaft forms an external spline, wherein the internal spline meshes with the external spline;

a rotor, wherein the rotor is configured to magnetically couple with a magnetic field causing the rotating assembly to rotate;

a sensor rotor; and a balancing plate, wherein the park lock gear, the rotor, the sensor rotor, and the balancing plate are disposed radially outwards of and axially aligned with the rotor shaft, wherein the park lock gear, the rotor, the sensor rotor, and the balancing plate are affixed to and configured to rotate with the rotor shaft, wherein the rotor is disposed axially between the park lock gear and the balancing plate, wherein the park lock gear and the balancing plate are configured to balance the rotating assembly, wherein the park lock gear balances the rotating assembly by the plurality of balancing holes;

a stator; and a park lock pawl, wherein the park lock gear is configured to and unlock the rotating assembly to and from the stator via the park lock pawl.

16. The electric drive unit of claim 15, wherein the park lock pawl comprises a pawl tooth, wherein the park lock pawl is configured to translate the pawl tooth radially inwards to engage with one of the plurality of external tooth gaps and radially outwards to disengage from the one of the plurality of external tooth gaps.

17. The electric drive unit of claim 15, comprising a sensor stator, wherein the sensor stator is axially aligned with and disposed radially outwards of the sensor rotor, wherein the sensor stator is configured to sense a rotary position of the rotating assembly via the sensor rotor.

18. The electric drive unit of claim 15, comprising an output shaft and a planetary gearset, wherein the output shaft is disposed radially inwards of and axially aligned with the rotor shaft, wherein the output shaft is engaged with the rotating assembly via a differential of the planetary gearset.

19. A method of assembling a rotating assembly, the method comprising:

affixing a rotor to a rotor shaft;

affixing a balancing plate and a sensor rotor to the rotor shaft;

affixing a park lock gear to the rotor shaft; and axially drilling the park lock gear and the balancing plate to balance the rotating assembly, wherein the axially drilling forms a plurality of balancing holes, wherein the rotating assembly comprises the park lock gear, the rotor shaft, the rotor, the balancing plate, and the sensor rotor, wherein the park lock gear comprises:

a cylindrical body, wherein the cylindrical body forms an internal spline, wherein the plurality of balancing holes are defined axially through at least a portion of the cylindrical body; and a plurality of external teeth, wherein the plurality of external teeth extend radially outward from the cylindrical body, wherein the plurality of external teeth define a plurality of external tooth gaps, wherein the plurality of external teeth and the plurality of external tooth gaps are defined in a polar array about a center axis of the park lock gear;

wherein the rotor shaft forms an external spline, wherein the internal spline meshes with the external spline;

wherein the rotor is configured to magnetically couple with a magnetic field causing the rotating assembly to rotate; and wherein the park lock gear, the rotor, the sensor rotor, and the balancing plate are disposed radially outwards of and axially aligned with the rotor shaft, wherein the park lock gear, the rotor, the sensor rotor, and the balancing plate are affixed to and configured to rotate with the rotor shaft, wherein the rotor is disposed axially between the park lock gear and the balancing plate, wherein the park lock gear and the balancing plate are configured to balance the rotating assembly, wherein the park lock gear balances the rotating assembly by the plurality of balancing holes.

20. The method of claim 19, further comprising:

removing the park lock gear from the rotor shaft;

affixing a bearing and a sleeve to the rotor shaft after the park lock gear is removed from the rotor shaft; and affixing the park lock gear to the rotor shaft after the bearing and the sleeve are affixed to the rotor shaft, wherein the rotating assembly comprises the bearing and the sleeve, wherein the bearing and the sleeve are disposed radially outwards of and axially aligned with the rotor shaft, wherein the bearing and the sleeve are affixed to and configured to rotate with the rotor shaft, wherein the rotor is disposed axially between the sensor rotor and the balancing plate, wherein the sensor rotor is disposed axially between the bearing and the rotor, wherein the bearing is disposed axially between the sleeve and the sensor rotor, wherein the sleeve is disposed axially between the park lock gear and the bearing.

* * * * *